Nov. 8, 1960 — J. R. CAMPBELL — 2,959,257
HONEYCOMB CORE AND PANEL UTILIZING SAME
Filed March 18, 1957 — 2 Sheets-Sheet 1
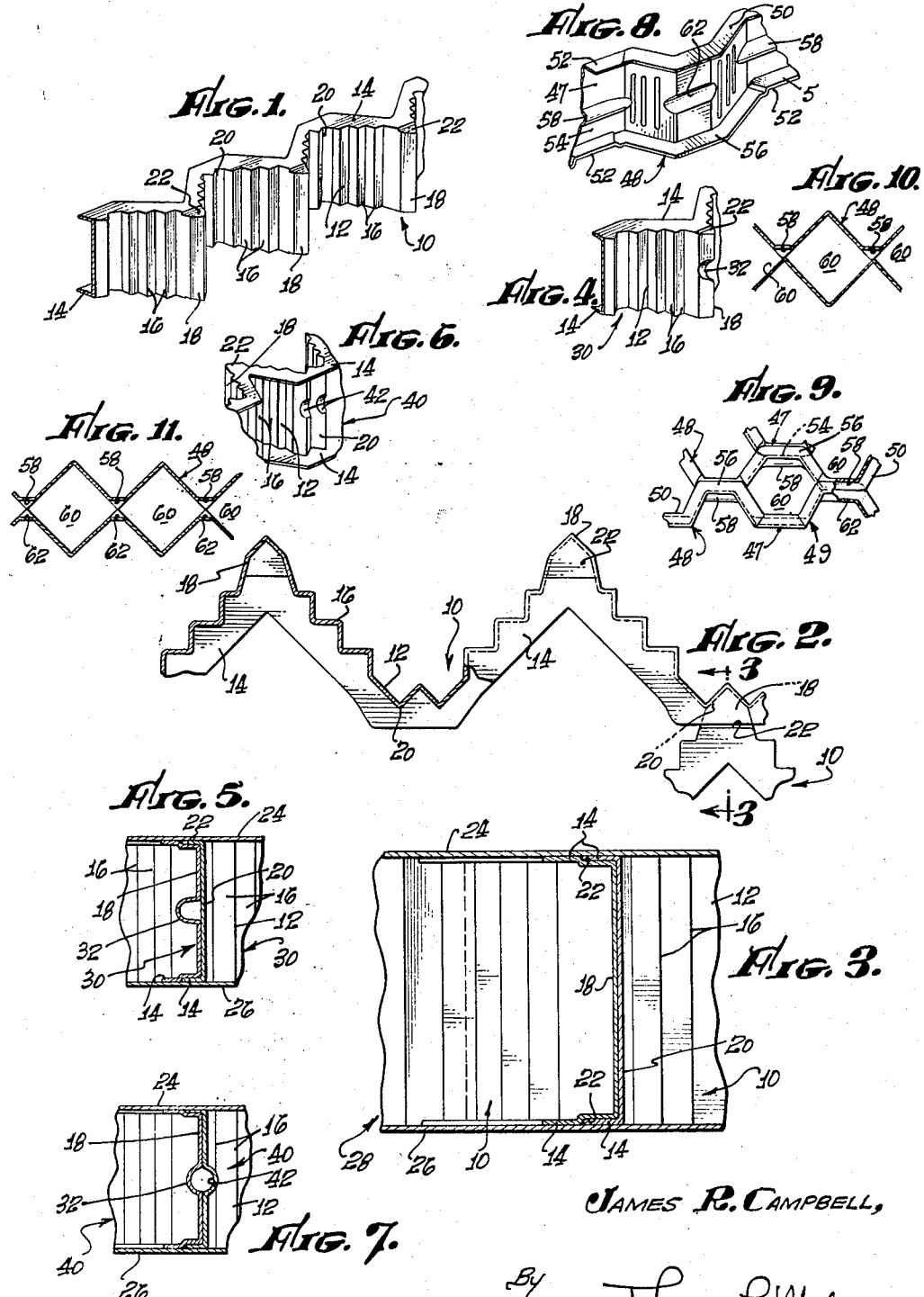
JAMES R. CAMPBELL,
By Thomas P. Maloney
ATTORNEY Nov. 8, 1960 J. R. CAMPBELL 2,959,257
HONEYCOMB CORE AND PANEL UTILIZING SAME
Filed March 18, 1957 2 Sheets-Sheet 2

INVENTOR.
JAMES R. CAMPBELL
BY Thomas P. Mahoney
ATTORNEY.

United States Patent Office 2,959,257
Patented Nov. 8, 1960

2,959,257

HONEYCOMB CORE AND PANEL UTILIZING SAME

James R. Campbell, 1504 Carmelita St., Laguna Beach, Calif.

Filed Mar. 18, 1957, Ser. No. 646,879

5 Claims. (Cl. 189—34)

This invention relates to a honeycomb core structure adapted to be utilized in the fabrication of structural panels and to structural panels manufactured by the use of the honeycomb core disclosed hereinbelow.

Reference is made hereby to my earlier filed application entitled "Structural Panel of Honeycomb Type," Serial No. 532,605, filed September 6, 1955, now Patent No. 2,910,153, wherein is disclosed a honeycomb core structure adapted to be utilized by itself or in fabricating a structurally reinforced panel.

Conventional honeycomb core structures are fabricated from various types of material such as aluminum foil, resin impregnated fabrics, such as fiber glass or the like, and various types of resin impregnated papers. While the core of my invention will be described as fabricated from stainless steel, it is, of course, understood that the principles of the invention can be applied with equal cogency to other metals and other types of material, such as fabric, paper, and the like where the utilization of the core structure will permit of the use of such materials. Furthermore, while the core structure and the surface sheets associated therewith constituting a core-reinforced panel are described as being welded into a unified structure, it is conceivable that other means of attachment of the individual core strips to one another to form the core and attach it to the surface sheets of the panel may be resorted to, such as various types of synthetic adhesives and the like, or by brazing.

Conventional core structures utilize corrugated strips which are flattened at their apices and bases to mate, one with the other, and to define what are substantially hexagonal cells. During the fabrication of conventional cores from such strips, great care must be taken in aligning the flattened apices and bases of the corrugations in order that a proper affixation of one strip to the other may be obtained to create a properly shaped core structure. Because of this difficulty, the core structures must be fabricated prior to the attachment of the surface sheets on the opposite sides thereof to form a core reinforced panel.

It is, therefore, an object of my invention to provide a core structure constituted by a plurality of individual core strips which are constituted by a central web having right-angularly directed flanges formed on the opposite edges thereof, said strips being fabricated in corrugated configuration and the web being provided with minor corrugations and with co-operating corrugations at the apices and bases of the major corrugations so that said minor corrugations at the apices and bases of the major corrugations will fit one within the other in order that registry of the core strips at the nodal points of the strips will be achieved.

An additional object of my invention is the provision of a core structure fabricated from core strips of the aforementioned character wherein the male nodal points, that is, the nodal points which are adapted to enter the corrugations between minor corrugations on an adjacent core strip, are provided with recesses in the flanges on the opposite edges thereof whereby said male nodal points will be received with greater facility between the spaced flanges on opposite edges of the receptor core strip.

By providing core strips of the aforementioned character, fabrication of the core structure within and simultaneously with the fabrication of a core reinforced panel in the manner described in my copending application, Serial No. 639,536, filed February 11, 1957, entitled "Method and Apparatus for Fabricating Structural Panel and Core Therefor," is greatly simplified, since no problem arises in the registration of adjacent nodal points of the core strips with one another and between the oppositely disposed surface sheets associated therewith.

It is well known to those skilled in the art that the high speed aircraft, and particularly the high speed combat aircraft presently in operation and on the design boards, are encountering extremely high temperatures which pose severe material problems and which, in the aircraft themselves, frequently result in skin and structural failures.

It is, therefore, another object of my invention to provide a structural honeycomb core wherein fluid passage means are formed between the adjacent contacting nodal points of the core so that free fluid circulation between the cells of the core may take place. Therefore, in high speed aircraft or missiles refrigerant or other fluids can be circulated freely throughout the cells of the core structure and between the surface sheets constituting the panel incorporating the same. In this manner, the deleterious effects of high temperature exposure on the structure of the aircraft can be dissipated and the necessity for the provision of separate ducts or tubing within the aircraft structure for conducting refrigerant or coolant liquids is eliminated.

An additional object of my invention is the provision, in a honeycomb core structure, of a depression in at least one of the webs at each nodal point in the core structure whereby fluid may be conducted from adjacent cells through the depressions in the webs at the nodal points, said depressions constituting fluid passages across the abutting nodal points of the core.

Other objects and advantages of my invention will be apparent from the following specification and the accompanying drawing which is for the purpose of illustration only and in which:

Fig. 1 is a perspective view showing a core strip constructed in accordance with the teachings of my invention;

Fig. 2 is a top plan view showing the operative relationship of the type of core strips shown in Fig. 1;

Fig. 3 is a vertical, sectional view taken on the broken line 3—3 of Fig. 2;

Fig. 4 is a fragmentary view showing the core strip of Fig. 1 modified by the provision of a fluid transmitting depression in the male corrugations thereof;

Fig. 5 is an enlarged, vertical, sectional view showing the utilization of a core strip of the character of Fig. 4 in conjunction with another core strip in a core structure;

Fig. 6 shows the core strip of Fig. 2 modified at its female nodal points;

Fig. 7 is an enlarged, vertical, sectional view showing the core strips of Fig. 6 in co-operative relationship with each other to provide a fluid passage at the nodal points of the core strip;

Fig. 8 is an enlarged, fragmentary view showing the modifications of the web of a core strip of the character disclosed in my copending application, Serial No. 532,605, to provide a fluid passage at each nodal point thereof;

Fig. 9 is a top plan view showing the appearance of a portion of a core structure fabricated from core strip of the character illustrated in Fig. 8;

Fig. 10 is a vertical, sectional view showing the fluid passages between the cells at the nodal points of a core structure incorporating partially modified core strips;

Fig. 11 is a sectional view showing fluid passages constituted by mating depressions at the nodal points of the core structure utilizing core strips of the character shown in Fig. 8 of the drawing.

Figure 12:
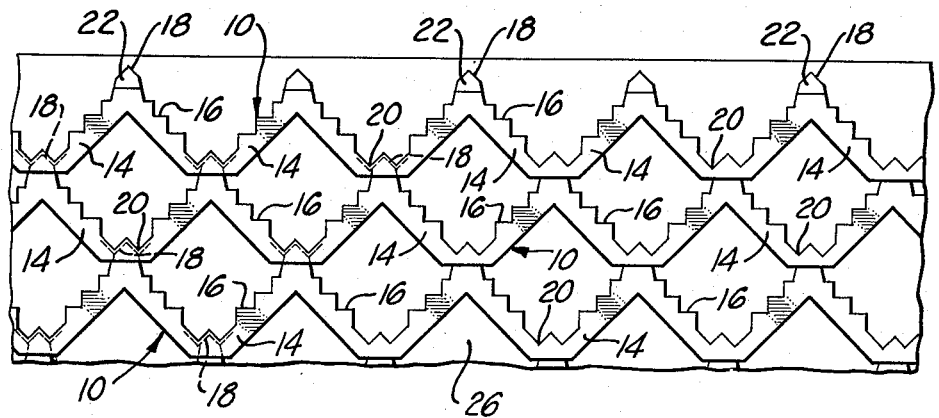
Fig. 12 is a top plan view of an assembled core structure utilizing the core strips shown in Fig. 2.

Referring to the drawing and particularly to Figs. 1–3 thereof, I show a core strip 10 constructed in accordance with the teachings of my invention, said core strip including a web 12 having right-angularly directed flanges 14 formed upon the opposite edges of said web. The core strip 10 is of wave form or corrugated configuration and the corrugations which define the primary form of the core strip 10 are referred to hereinafter as the major corrugations, since the web 12 of the core strip is provided with minor corrugations 16 to rigidify said web and to provide male corrugations 18 at alternating nodal points while female corrugations 20 are provided between said male corrugations whereby the male corrugations 18 will be received in the space between the female corrugations 20, in the manner shown in Fig. 3 of the drawing.

It will be noted that depressions 22 are formed in the flanges 14 at the upper and lower extremities of the male corrugations, said depressions being of sufficient depth so that the flanges 14 on the male corrugations 18 will fit readily within the mating flanges 14 overlying the female corrugaitons 20.

Depressions 22 may be formed such that the depressed surfaces are essentially parallel to the flanges 14 as shown or, as I have found in constructing panels of light gage core materials, depressions 22 may be more of a bevel or chamfer sufficient to provide entry of the male node within the mating female node flanges, the more parallel mating of the interlocked surfaces of the nodal flanges being effected by the confinement of the mating parts within the supporting parts of the core or panel fabricating machines.

Therefore, when the individual core strips 10 are assembled in operative relationship with one another and with surface sheets 24 and 26 in the manner graphically illustrated in Fig. 3 of the drawing to provide a core reinforced panel 28, absolute alignment of the mating nodal points on adjacent core strips 10 is readily achieved since the male corrugations 18 readily seat between the female corrugations 20 on a contiguous nodal point and the depressions 22 readily fit within the mating flanges 14 on the contiguous core strip at the adjacent nodal point thereof.

In addition, the operative relationship between the core strips 10 is graphically illustrated in Fig. 12 of the drawings wherein a plurality of core strips 10 are shown as operatively engaged with one another with the male corrugations 18 thereupon seated within the female corrugations 20 on a contiguous nodal point. It will be noted that the depressions 22 on the flanges 14 at the upper and lower edges of the core strips 10 facilitate the internesting of the male corrugations 18 with the female corrugations 20.

With the nodal points of contiguous core strips 10 properly registered, one with the other, a welding roller or other welding means may be applied to the exterior of the sheets 24 and 26 to weld the flanges 14 of the core strips 10 to each other at the nodal points and to the interior surfaces of the surface sheets 24 and 26. In this manner, both the core and the surface sheets are secured to one another simultaneously and the prior art method of fabricating the core separately from the panel in which it is utilized can be dispensed with. Of course, if desired, the individual core strips 10 can be assembled in operative relationship with one another to fabricate a core to which the panels 24 and 26 can be ultimately applied if desired.

As previously indicated, while the panel and core strip of my invention are described as fabricated from stainless steel, it is, of course, intended that other materials can be utilized in the same configurations where the use of such substitute materials is feasible and indicated. Moreover, while the stainless steel core strips and surface sheets have been described as being welded in operative relationship with one another to provide core reinforced panels of the character of that of the panel 28, it is conceivable that various types of adhesives may be substituted for such welding when materials not susceptible to the welding process are used in the core strips and in the surface sheets.

As previously indicated, the stainless steel core strips 10 and the structural panel fabricated by the use of the same have particular application in high speed aircraft wherein the high speeds generate extremely high temperatures. The speeds now contemplated and presently being achieved by such high speed aircraft entail the use of supplemental coolant means to prevent the failure of even the temperature resistant panels constructed in accordance with the teachings of my invention and I propose to provide fluid passages at the nodal points between the cells of the core to permit free fluid flow of coolants and refrigerants between the cells in order that the high temperatures to which the panels are subjected may be reduced and thus the possibility of failure of the panels and the core embodied in the same be obviated.

For instance, a modified form of the core strip 10 is shown at 30 in Fig. 4 of the drawing, said core strip being provided with semi-circular depressions 32 in the male corrugations 18 thereof which, of course, constitute depressions in the web 12 at the alternate male nodal points thereof. Such depressions 32 are formed in each of the male corrugations 18 and assume the form shown in Fig. 4 of the drawing. Of course, while I have described the depressions as being substantially semi-circular in configuration, they, of course, can assume any configuration which it is feasible to form in the male corrugations 18, or which are deemed necessary for thermodynamic reasons.

Therefore, when core strips 30 are assembled in operative relationship with one another, as graphically illustrated in Fig. 5 of the drawing, the semi-circular depressions 32 in the male corrugations 18 will be juxtaposed to unmodified webs 16 between the female corrugations 20. Therefore, semi-circular fluid passages will be defined between the adjacent cells to permit free circulation of refrigerant or coolant or other liquid or fluid therebetween.

In order to increase the volume of the fluid passages, it is desirable to provide a core strip of the character of the core strip 40 shown in Fig. 6 of the drawing wherein the female corrugations 20 are provided with semi-circular depressions 42 therein which mate, as best shown in Fig. 7 of the drawing, with the corresponding semi-circular depression 32 at the male corrugations 18, thus providing fluid passages of larger volume between adjacent cells. Therefore, the core strip 40 includes depressions 32 at the male corrugations 18 and mating depressions at the female corrugations 20.

An alternative form of fluid conducting core strip 48 adapted to be assembled into cores of the character of that shown at 49 in Fig. 9 of the drawing is illustrated in Fig. 8 of the drawing. The core strip 48 is of corrugated form and includes a web 47 having right-angularly directed flanges 50 formed upon the opposite edges thereof. Depressions 52 are formed in the flanges 50 at male nodal points 54 to permit said flanges to fit between the flanges 50 at female nodal points 56, in the manner shown in Fig. 9 of the drawing.

If desired, fluid conducting depressions 58 can be formed in the web 47 at the male nodal points 54, only, to provide the co-operative relationship between the male and female nodal points shown in section in Fig. 10 of the drawing wherein fluid passes by means of the depressions 58 between the cells 60.

On the other hand, mating depressions 62 can be formed in the web 47 at the female nodal points 56 and thus the co-operative depressions 58 and 62 in the male and female nodal points 54 and 56 provide fluid passages of the character shown in the sectional view of Fig. 11 of the drawing between adjacent cells 60 of the core structure. Also, the depressions may be located closer to one face so as to effect greater cooling of the face, or, the depressions may extend for substantially the full length of the nodal abutment.

When the core structures, including fluid passages at the nodal points thereof, are fabricated in conjunction with surface sheets 24 and 26 to provide fluid conducting panels of the character of those shown in Figs. 5 and 6 of the drawing, the cells 60 are fluid-tight because of the continuous affixation of the flanges upon the individual core strips to the interior surfaces of the surface sheets 24 and 26. Therefore, if desired, the individual banks of cells can be fluid isolated from one another to permit different fluids to be carried through adjacent cells in the same panel and thus one panel can provide a large number of separate fluid passages between the individual cells thereof.

In transverse shear the internested male and female corrugations, the areas of the surface sheets overlying the same, and the flange areas at the opposite extremities of said male and female corrugations provide greater area for distributing and this minimizing the effects of shear.

I thus provide by my invention a core strip which is adapted to be readily assembled in operative relationship with others of the same construction so that a core and panel structure may be simultaneously fabricated. I also provide a core reinforced fluid conducting panel whereby fluid passages are incorporated at the nodal points of the core structure incorporated in the panel to permit free fluid flow between the cells of said panel.

I claim as my invention:

1. A core for a structural element including a plurality of corrugated strips having webs with flanges on the upper and lower edges thereof directed in planes substantially normal to the planes of said strips, the two flanges of one strip fitting within the two flanges of an adjacent strip at nodal points, said flanges having recesses at alternate nodal points to provide male nodal points receivable in adjacent nodal points and said webs of said strips being in contact at said nodal points with male protrusions on the web of said one strip at said nodal points and female recesses in said web of said adjacent strip at said nodal points having said male protrusions located therein.

2. A core for a structural element including a plurality of corrugated strips having webs with flanges on their opposite edges directed in planes substantially normal to the planes of said strips, the flanges of one strip fitting within the flanges of an adjacent strip at nodal points, the webs of said strips being in contact at said nodal points with male protrusions formed on the web of said one strip at said nodal points and female recesses formed in said web of said adjacent strip at said nodal points and having said male protrusions located therein to laterally locate said one and adjacent strips with reference to each other.

3. A core for a structural element including a plurality of corrugated strips having webs with flanges on their opposite edges directed in planes substantially normal to the planes of said strips, the flanges of one strip fitting within the flanges of an adjacent strip at nodal points, the webs of said strips being in contact at said nodal points with male protrusions formed on the web of said one strip at said nodal points and female recesses formed in said web of said adjacent strip at said nodal points and having said male protrusions located therein to laterally locate said one and adjacent strips with reference to each other, the web of said one strip having a portion thereof depressed at said nodal points to provide fluid passages at said nodal points in parallel with the plane of said web.

4. In a structural panel, the combination of: a honeycomb core having a plurality of corrugated channels whose opposite flanges are interfitted within one another at adjacent nodal points to provide two superimposed layers of materials at interfitting nodal points and to define a plurality of cells between said nodal points, the webs of said channels engaging at said nodal points and having interlocking male protrusions and female receptacles to laterally locate said channels with respect to each other; and surface sheets secured to said flanges to provide three superimposed layers of material at said nodal points and two superimposed layers of material along the lengths of said flanges.

5. In a structural panel, the combination of: a honeycomb core having a plurality of corrugated core strips having webs incorporating flanges on the opposite edges thereof which are interfitted within one another at adjacent nodal points to provide two superimposed layers of material at interfitting nodal points and to define a plurality of cells, the webs of said strips engaging at said nodal points and having depressed portions defining fluid passages between said cells, said webs having interlocking male protrusions and female receptacles at said nodal points to laterally locate said strips; and surface sheets secured to said flanges to provide three superimposed layers of material at said nodal points and two superimposed layers of material along the lengths of said flanges.

References Cited in the file of this patent
UNITED STATES PATENTS

| | | |
|---|---|---|
| 2,076,811 | Ehlers | Apr. 13, 1937 |
| 2,644,777 | Havens | July 7, 1953 |
| 2,772,757 | Hammond | Dec. 4, 1956 |

FOREIGN PATENTS

| | | |
|---|---|---|
| 292,708 | Great Britain | June 28, 1928 |